(12) United States Patent
Gelmetti

(10) Patent No.: US 8,393,467 B2
(45) Date of Patent: *Mar. 12, 2013

(54) RETAINER FOR WELDING WIRE CONTAINER, HAVING FINGERS AND HALF-MOON SHAPED HOLDING TABS

(75) Inventor: Carlo Gelmetti, Lazise (IT)

(73) Assignee: Sidergas SpA (IT)

( * ) Notice: Subject to any disclaimer, the term of this patent is extended or adjusted under 35 U.S.C. 154(b) by 384 days.

This patent is subject to a terminal disclaimer.

(21) Appl. No.: 12/545,720

(22) Filed: Aug. 21, 2009

(65) Prior Publication Data

US 2011/0042254 A1    Feb. 24, 2011

(51) Int. Cl.
*B65D 85/00* (2006.01)
(52) U.S. Cl. ............... 206/408; 242/128; 242/423.1
(58) Field of Classification Search ............ 242/156.1, 242/128, 423.1; 229/77, 82; 206/408
See application file for complete search history.

(56) References Cited

U.S. PATENT DOCUMENTS

| | | |
|---|---|---|
| 318,062 A | 5/1885 | Warren |
| 532,565 A | 1/1895 | Kilmer |
| 617,353 A | 1/1899 | Redmond |
| 627,722 A | 6/1899 | Edwards |
| 932,808 A | 8/1909 | Pelton |
| 1,640,368 A | 8/1927 | Obetz |
| 1,907,051 A | 5/1933 | Emery |
| 2,059,462 A | 11/1936 | Jungmann |
| 2,407,746 A | 9/1946 | Johnson |
| 2,713,938 A | 7/1955 | Snyder |
| 2,724,538 A | 11/1955 | Schweich |
| 2,838,922 A | 6/1958 | Gift .............................. 66/125 R |
| 2,849,195 A | 8/1958 | Richardson |
| 2,864,565 A | 12/1958 | Whearly ........................ 242/128 |
| 2,869,719 A | 1/1959 | Hubbard |
| 2,880,305 A | 3/1959 | Baird |
| 2,929,576 A | 3/1960 | Henning |
| 2,966,258 A | 12/1960 | Krafft |
| 2,974,850 A | 3/1961 | Mayer |
| 3,185,185 A | 5/1965 | Pfund |
| 3,244,347 A | 4/1966 | Jenk |
| 3,463,416 A | 8/1969 | Quenot ....................... 242/396.9 |
| 3,478,435 A | 11/1969 | Cook |
| 3,491,876 A | 1/1970 | Zecchin |
| 3,512,635 A | 5/1970 | Lang |

(Continued)

FOREIGN PATENT DOCUMENTS

| | | |
|---|---|---|
| CN | 1626423 | 6/2005 |
| DE | 1011840 B | 7/1957 |

(Continued)

OTHER PUBLICATIONS

European Search Report, Appln. No. 10014216.5-1256 (8 pgs).

(Continued)

*Primary Examiner* — J. Gregory Pickett
*Assistant Examiner* — Raven Collins
(74) *Attorney, Agent, or Firm* — Hayes Soloway P.C.

(57) ABSTRACT

A retainer for a welding wire container has a base element and at least one upper element which rests on the base element. The base element has a central opening for allowing the welding wire to pass through, and at least two guiding openings through which holding fingers extend. The holding fingers are part of the upper element and are made from a flexible material.

11 Claims, 7 Drawing Sheets

U.S. PATENT DOCUMENTS

| | | | |
|---|---|---|---|
| 3,565,129 | A | 2/1971 | Field |
| 3,567,900 | A | 3/1971 | Nelson |
| 3,576,966 | A | 5/1971 | Sullivan |
| 3,595,277 | A | 7/1971 | Lefever |
| 3,648,920 | A | 3/1972 | Stump |
| 3,724,249 | A | 4/1973 | Asbeck et al. |
| 3,729,092 | A | 4/1973 | Marcell |
| 3,799,215 | A | 3/1974 | Willems |
| 3,815,842 | A | 6/1974 | Scrogin ............ 242/423.1 |
| 4,044,583 | A | 8/1977 | Kinney, Jr. |
| 4,074,105 | A | 2/1978 | Minehisa et al. |
| 4,102,483 | A | 7/1978 | Ueyama et al. |
| 4,172,375 | A | 10/1979 | Rushforth et al. |
| 4,188,526 | A | 2/1980 | Asano |
| 4,222,535 | A | 9/1980 | Hosbein ............ 242/128 |
| 4,254,322 | A | 3/1981 | Asano |
| 4,293,103 | A | 10/1981 | Tsukamoto |
| 4,464,919 | A | 8/1984 | Labbe |
| 4,546,631 | A | 10/1985 | Eisinger |
| 4,582,198 | A | 4/1986 | Ditton |
| 4,585,487 | A | 4/1986 | Destree et al. |
| 4,623,063 | A | 11/1986 | Balkin |
| 4,869,367 | A * | 9/1989 | Kawasaki et al. ............ 206/409 |
| 4,891,493 | A | 1/1990 | Sato et al. |
| 4,949,567 | A | 8/1990 | Corbin |
| 5,078,269 | A | 1/1992 | Dekko et al. |
| 5,109,983 | A | 5/1992 | Malone et al. |
| 5,205,412 | A | 4/1993 | Krieg |
| 5,227,314 | A | 7/1993 | Brown et al. |
| 5,261,625 | A | 11/1993 | Lanoue ............ 242/129.8 |
| 5,277,314 | A | 1/1994 | Cooper et al. ............ 206/398 |
| 5,314,111 | A | 5/1994 | Takaku et al. |
| 5,372,269 | A | 12/1994 | Sutton et al. |
| 5,452,841 | A | 9/1995 | Sibata et al. |
| 5,485,968 | A * | 1/1996 | Fujioka ............ 242/125.2 |
| 5,494,160 | A | 2/1996 | Gelmetti |
| 5,553,810 | A | 9/1996 | Bobeczko |
| 5,586,733 | A * | 12/1996 | Miura et al. ............ 242/125.2 |
| 5,590,848 | A | 1/1997 | Shore et al. |
| 5,692,700 | A | 12/1997 | Bobeczko |
| 5,739,704 | A | 4/1998 | Clark |
| 5,746,380 | A | 5/1998 | Chung |
| 5,816,466 | A | 10/1998 | Seufer |
| 5,819,934 | A | 10/1998 | Cooper |
| 5,845,862 | A | 12/1998 | Cipriani ............ 242/423.1 |
| 5,865,051 | A | 2/1999 | Otzen et al. |
| 5,931,408 | A * | 8/1999 | Ishii et al. ............ 242/580 |
| 5,971,308 | A | 10/1999 | Boulton |
| 6,019,303 | A | 2/2000 | Cooper |
| 6,301,944 | B1 | 10/2001 | Offer |
| 6,322,016 | B1 | 11/2001 | Jacobsson et al. |
| 6,340,522 | B1 | 1/2002 | Burke et al. |
| 6,425,549 | B1 * | 7/2002 | Bae et al. ............ 242/580 |
| 6,464,077 | B1 | 10/2002 | Liu |
| 6,547,176 | B1 | 4/2003 | Blain et al. ............ 242/423.1 |
| 6,648,141 | B2 | 11/2003 | Land |
| 6,708,864 | B2 | 3/2004 | Ferguson, III et al. |
| 6,745,899 | B1 | 6/2004 | Barton |
| 6,821,454 | B2 | 11/2004 | Visca et al. |
| 7,004,318 | B2 | 2/2006 | Barton ............ 206/409 |
| 7,152,735 | B2 | 12/2006 | Dragoo et al. |
| 7,178,755 | B2 | 2/2007 | Hsu et al. ............ 242/423.1 |
| 7,220,942 | B2 | 5/2007 | Barton et al. |
| 7,950,523 | B2 * | 5/2011 | Gelmetti ............ 206/408 |
| 2002/0003014 | A1 | 1/2002 | Homma |
| 2002/0014477 | A1 | 2/2002 | Lee et al. |
| 2004/0020041 | A1 | 2/2004 | Ferguson, III et al. |
| 2004/0155090 | A1 | 8/2004 | Jensen |

FOREIGN PATENT DOCUMENTS

| | | | |
|---|---|---|---|
| DE | 1082215 | | 11/1957 |
| DE | 2122958 | | 11/1972 |
| DE | 2202177 | | 7/1973 |
| EP | 0519424 | A1 | 12/1992 |
| EP | 0686439 | A1 | 12/1995 |
| EP | 1057751 | A1 | 12/2000 |
| EP | 1 295 813 | | 3/2003 |
| EP | 2 168 706 | | 3/2010 |
| FR | 1215111 | | 4/1960 |
| FR | 2055181 | | 5/1971 |
| FR | 2595674 | | 3/1988 |
| GB | 880502 | | 10/1961 |
| GB | 1168928 | | 10/1969 |
| GB | 1229913 | | 4/1971 |
| GB | 2059462 | | 4/1981 |
| JP | 49-13065 | | 2/1974 |
| JP | 54-043856 | | 4/1979 |
| JP | 55-156694 | | 12/1980 |
| JP | 56-023376 | | 3/1981 |
| JP | 57-102471 | | 6/1982 |
| JP | 58-035068 | | 3/1983 |
| JP | 58-70384 | | 5/1983 |
| JP | 59-197386 | | 11/1984 |
| JP | 59-229287 | | 12/1984 |
| JP | 59-232669 | | 12/1984 |
| JP | 60-021181 | | 2/1985 |
| JP | 60-032281 | | 2/1985 |
| JP | 60-184422 | | 9/1985 |
| JP | 60-223664 | | 11/1985 |
| JP | 61-293674 | | 12/1986 |
| JP | 62-009774 | | 1/1987 |
| JP | 62-111872 | | 5/1987 |
| JP | 62-287055 | | 12/1987 |
| JP | 63-147781 | | 6/1988 |
| JP | 1-240222 | | 9/1989 |
| JP | 03264169 | A | 11/1991 |
| JP | 04-133973 | | 5/1992 |
| JP | 4-274875 | | 9/1992 |
| JP | 08-150492 | | 6/1996 |
| JP | 08-267274 | | 10/1996 |
| JP | 2000-225468 | | 8/2000 |
| JP | 2000-263239 | | 9/2000 |
| JP | 2001-26375 | | 1/2001 |
| JP | 2001-150187 | | 6/2001 |
| JP | 2004-025242 | | 1/2004 |
| JP | 2004-025243 | | 1/2004 |
| RU | 793678 | | 1/1981 |
| RU | 1412830 | | 7/1988 |
| WO | WO 8810230 | | 12/1988 |
| WO | WO 94-00493 | | 1/1994 |
| WO | WO 94-19258 | | 9/1994 |
| WO | WO 00-50197 | | 8/2000 |
| WO | WO 03/106096 | | 12/2003 |
| WO | WO 03-106096 | A1 | 12/2003 |
| WO | WO 2007/112972 | | 10/2007 |

OTHER PUBLICATIONS

US Official Action dated Feb. 13, 2012, issued in U.S. Appl. No. 12/917,320 (14 pgs).

* cited by examiner

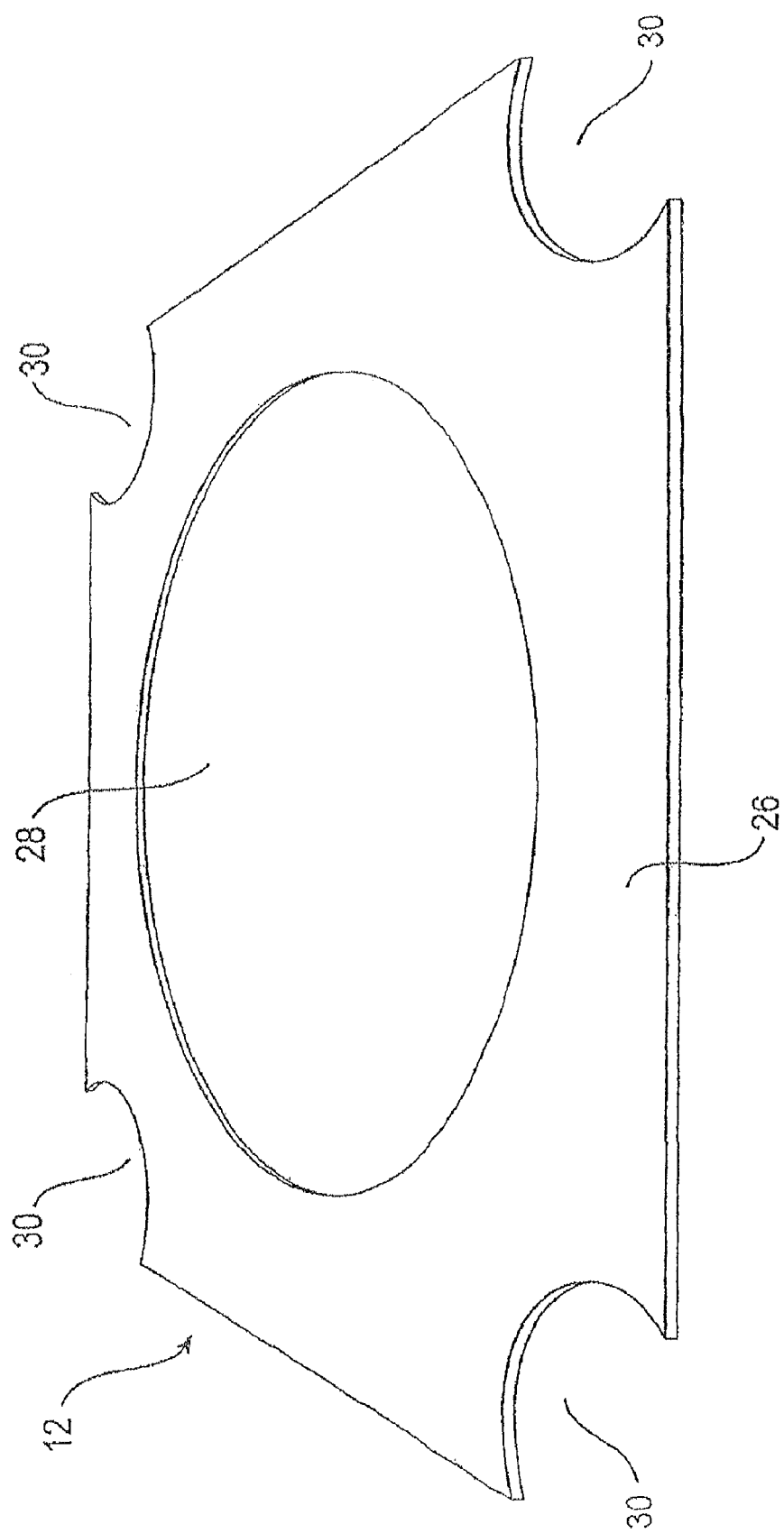
FIG. 1 - PRIOR ART

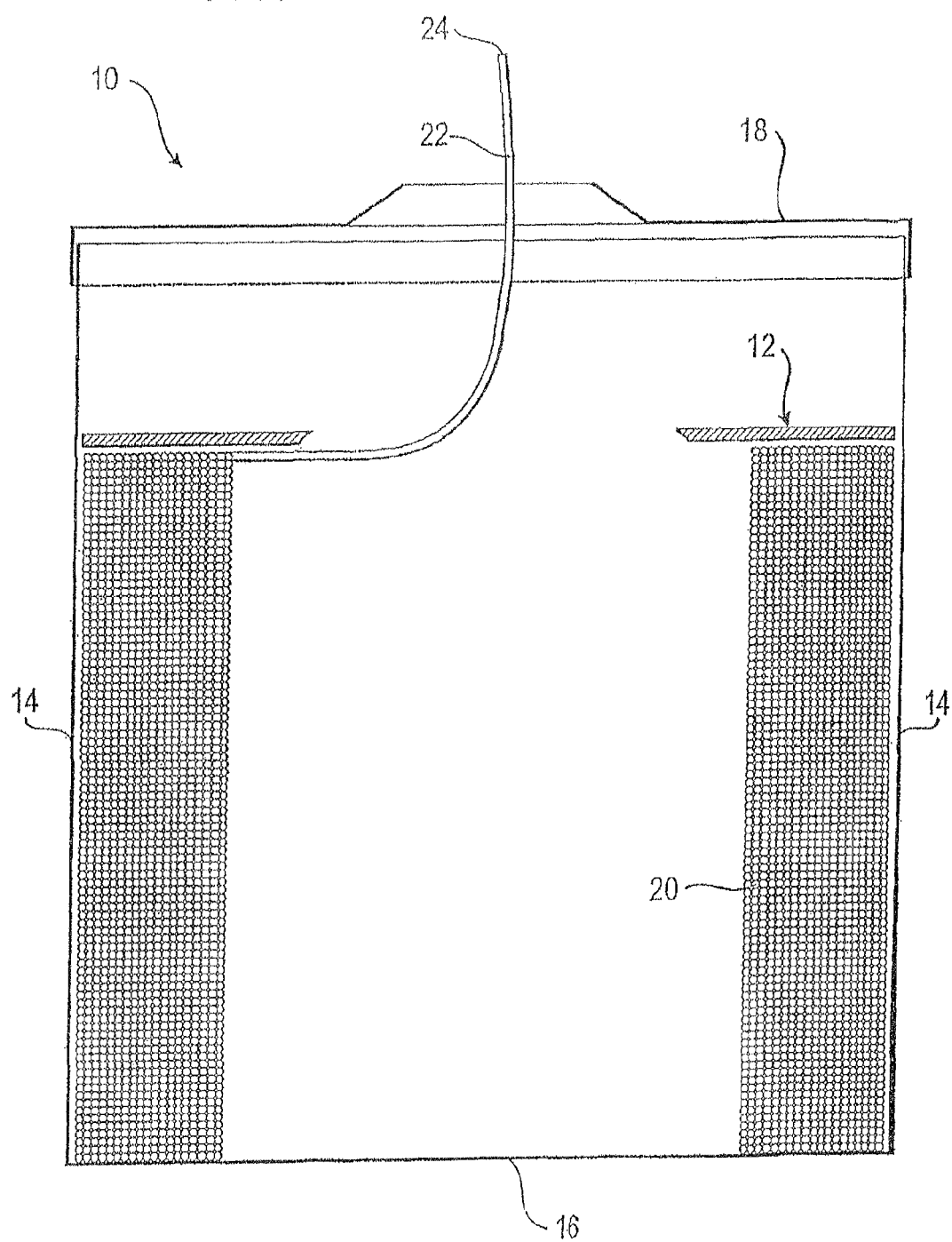
FIG. 2 - PRIOR ART

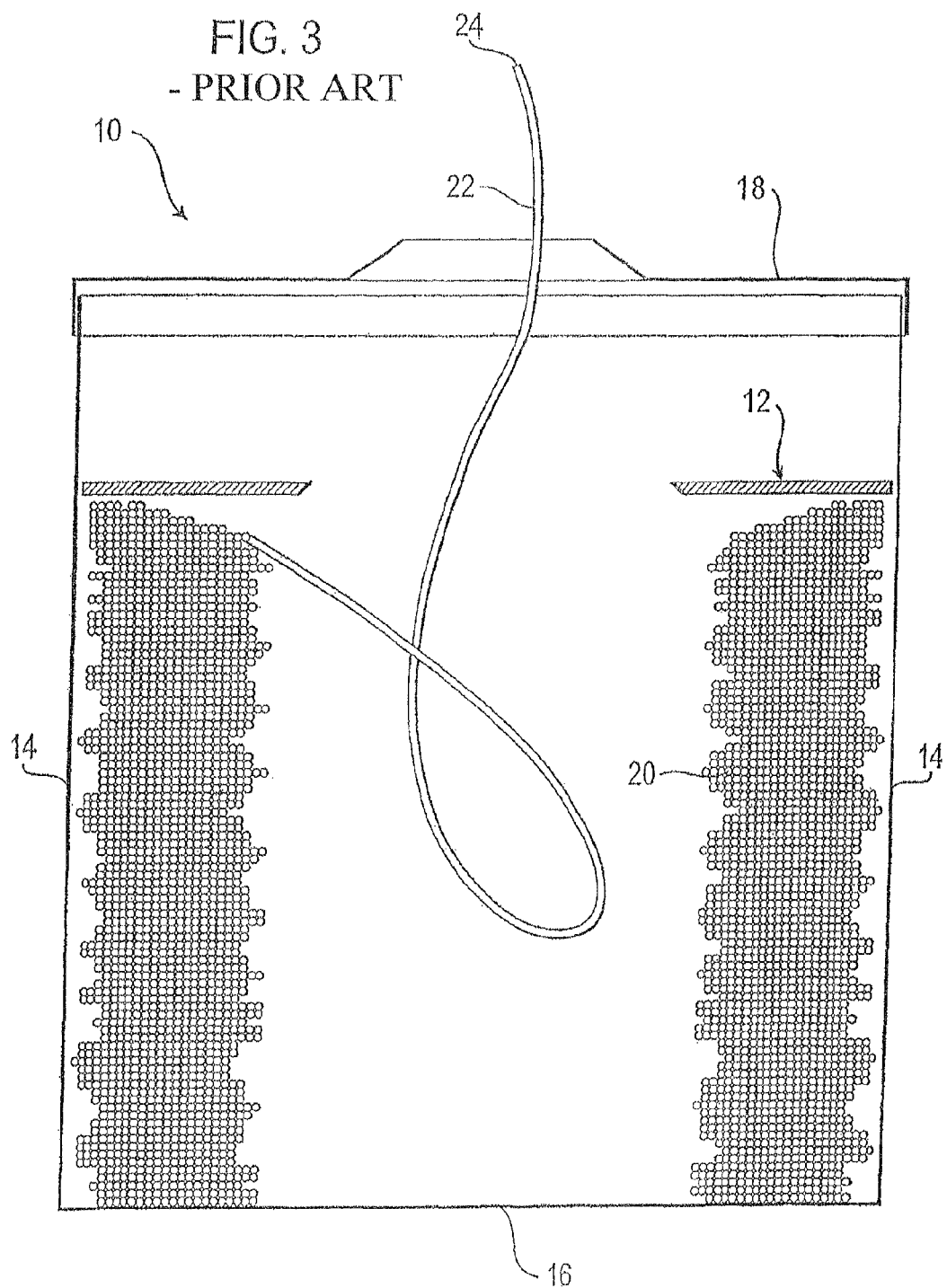

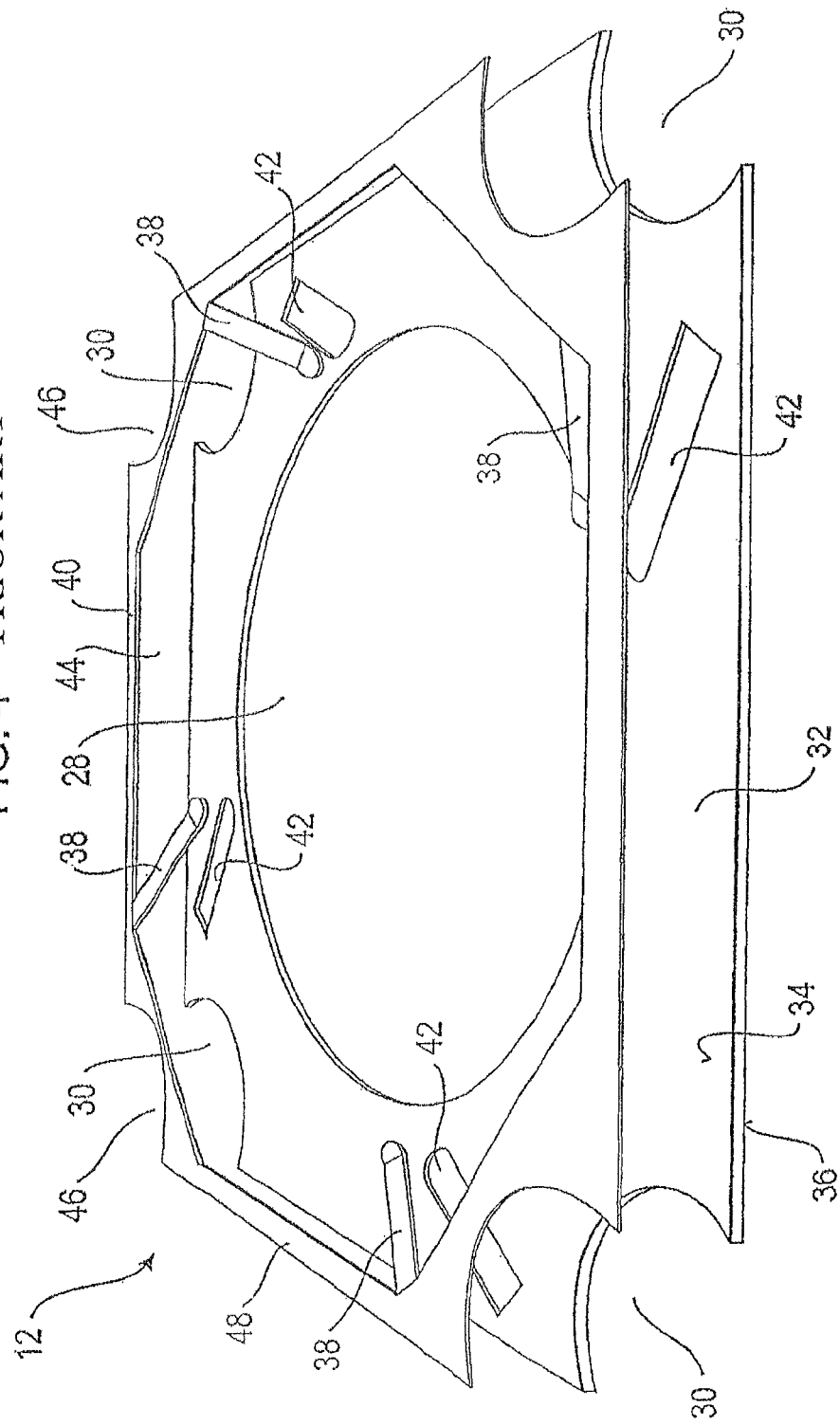
FIG. 4 - PRIOR ART

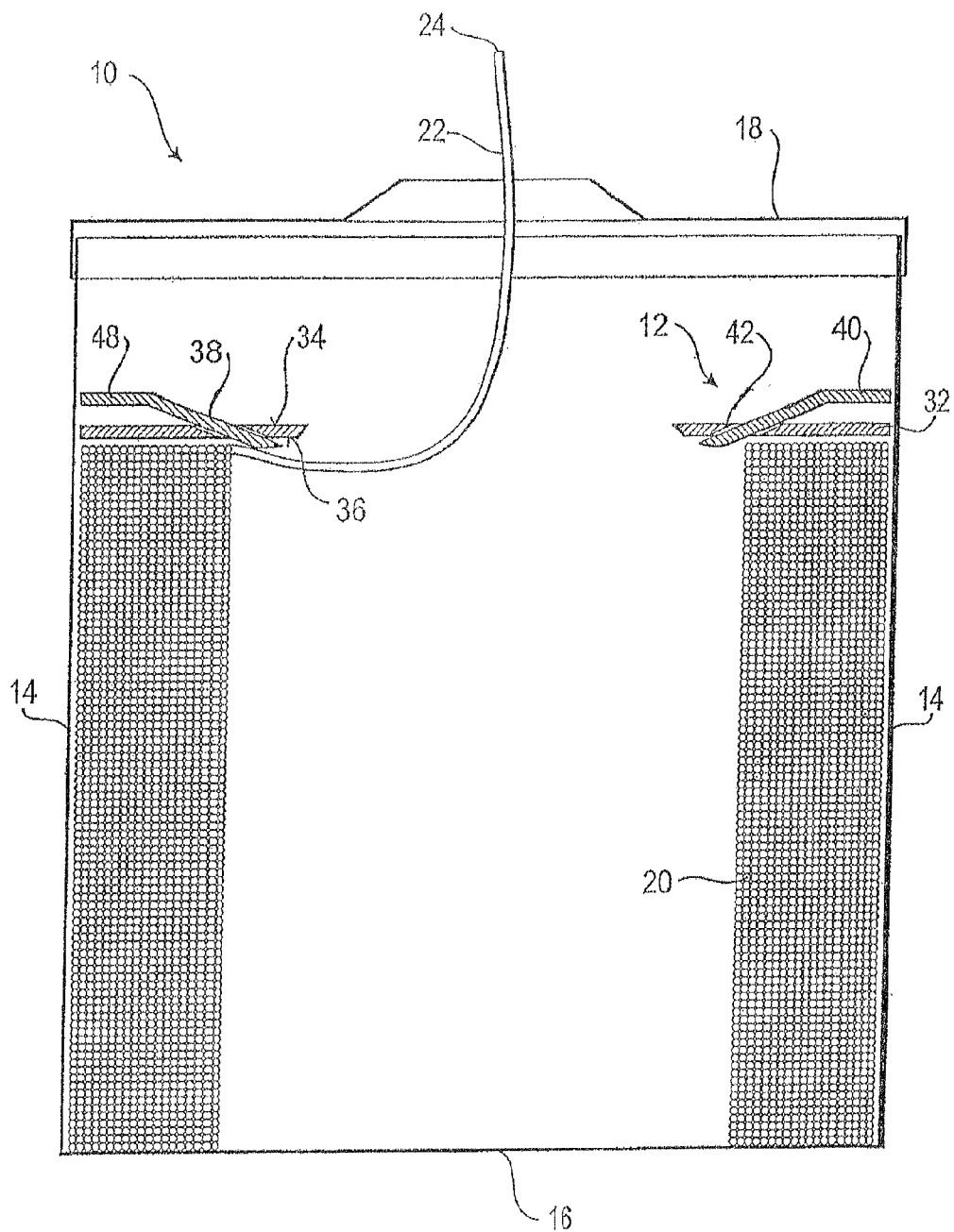
FIG. 5 - PRIOR ART

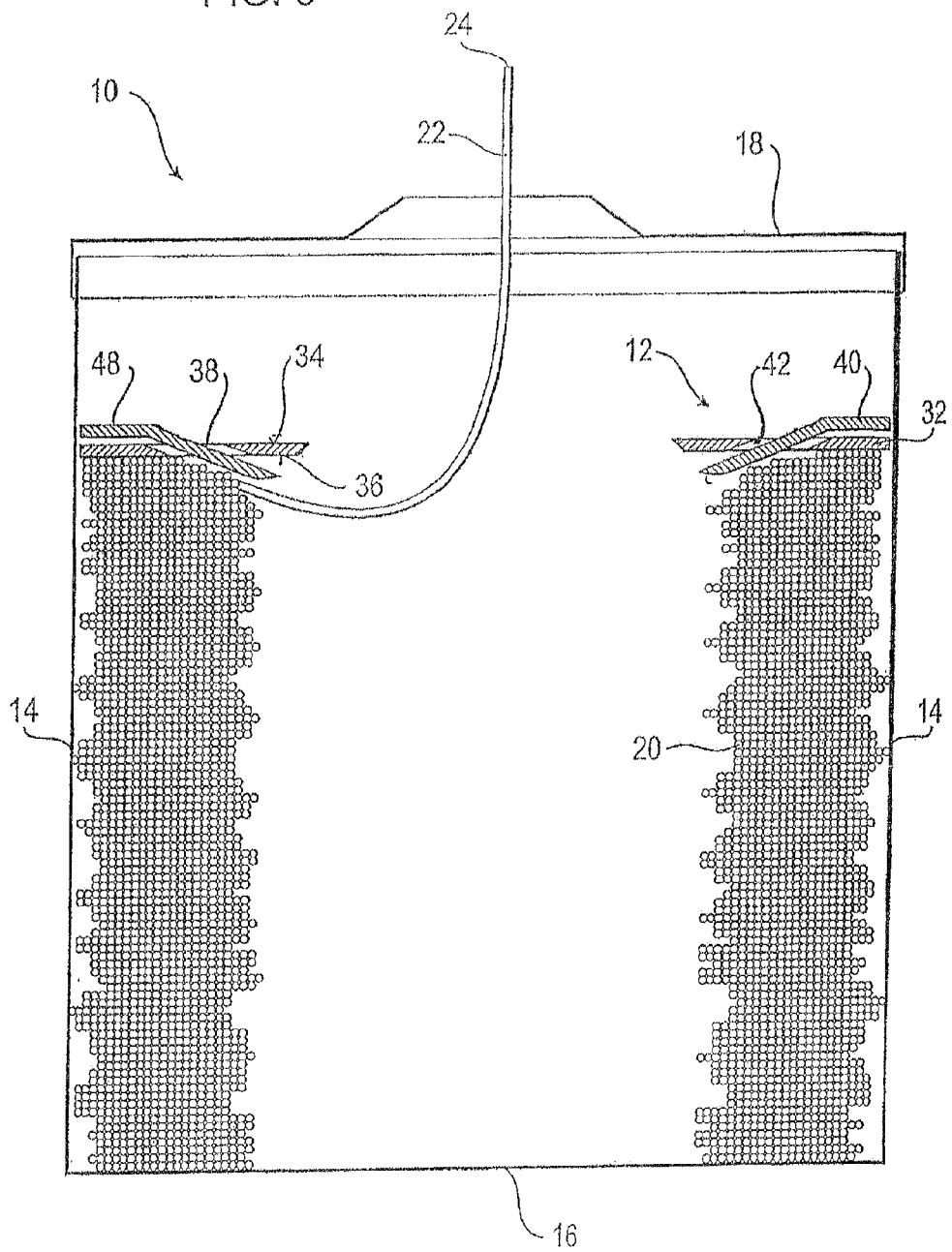
FIG. 6 - PRIOR ART

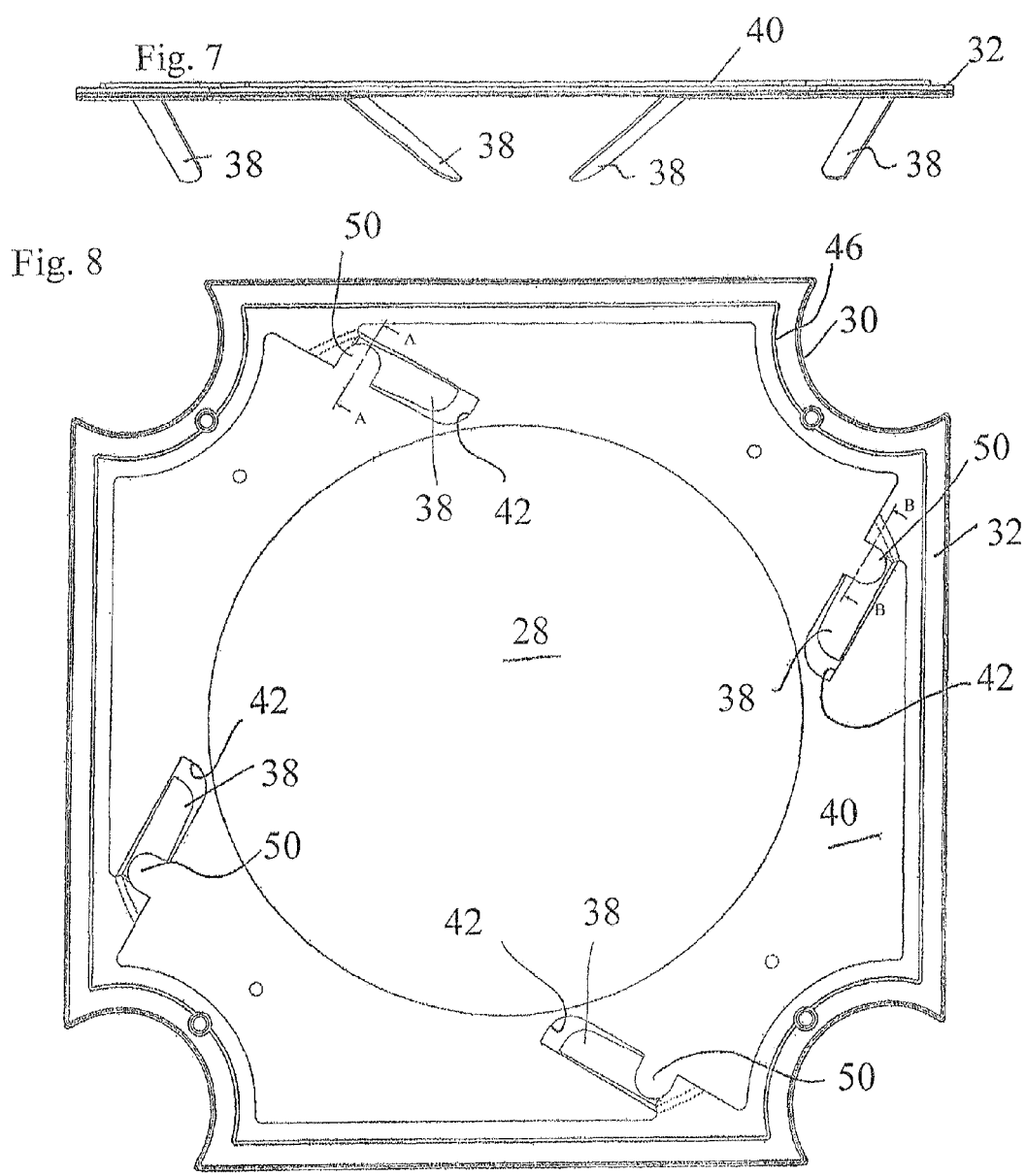

RETAINER FOR WELDING WIRE CONTAINER, HAVING FINGERS AND HALF-MOON SHAPED HOLDING TABS

FIELD OF THE INVENTION

The invention relates to a retainer for a welding wire coil.

BACKGROUND OF THE INVENTION

In the welding automation processes, the use of bulk containers with larger quantities of welding wire is Increasingly popular since a reduction of welding wire spool changes contributes to reduce the downtime and increases the productivity and cost savings.

However, the welding wire being paid out from the container could be affected by feeding problems and tangles which would compromise the savings offered by the lesser number of spool changes.

For the control of the strands of welding wire being paid out from the container many systems have been adopted, some represented by a single element, some with more elements interacting with one another, and some made of different materials but all the solutions adopted. Examples can be found in EP 1 295 813 A2, JP 20010 26375, U.S. Pat. No. 5,845,862, U.S. Pat. No. 6,547,176, U.S. Pat. No. 5,277,314, U.S. Pat. No. 5,746,380 and U.S. Pat. No. 7,004,318. Even those retainers which are floating with the wire do usually not interact dynamically with the variables of welding wire coils being 20 wound by different machines, with different adjustments, with varying sizes of welding wire and varying dimensions of the containers. The coil of wire is sometimes offset from the center of the pack and the thickness of the coil varies depending on the machine adjustment and the wire diameter.

WO 2007/112972 teaches of a combined retainer formed by a base element 25 with openings that accommodate the holding fingers of an upper element, the holding fingers being inserted into the openings of the base element and are designed for grabbing the wire before it falls into the center of the pack. In fact most tangling is caused by strands of wire that could fall into the center of the container out of the control of the retainer, and would knot as a consequence of bad adjustment of the wire feeder rolls or tangle after catching against the conical or cylindrical core member often used in the packs.

A problem with WO 2007/112972 is represented by the variable of the coil width which is rarely consistent for a number of reasons, in particular machine adjustment, winding pattern changing with changing of wire diameter, and wire strands settling down into the container as a consequence of vibrations during handling and transport. One additional problem with WO 2007/112972 is that both the base and the upper element are made with rigid material, and the holding fingers, depending on their placement could deform the wire when they come in contact with the strand being paid from the container.

Also, if the welding wire stops shortly before the holding finger, the holding finger will oppose more resistance when the touch the wire right after the welding operation is resumed.

The object of the present invention is to provide a retainer which perfectly holds the welding wire in its proper position, even if the welding wire coil settles during transportation and for varying diameters of the welding wire coil.

SUMMARY OF THE INVENTION

For this purpose, the invention provides a retainer for a welding wire coil, which retainer has a base element and at least one upper element which rests on the base element. The base element has a central opening for allowing the welding wire to pass through, and at least two guiding openings through which holding fingers extend. The holding fingers are part of the upper element and are made from a flexible material.

Preferably, four guiding openings are provided which are evenly spaced in a peripheral direction. This number of openings has proven sufficient for controlling the wire under a plurality of different conditions.

According to a preferred embodiment, pressing parts are provided which act on the holding fingers so as to bend them downwardly. The pressing parts exert a downwardly acting force which adds to the force resulting from the flexibility of the holding fingers, thereby ensuring that the holding fingers maintain contact with the upper portion of the welding wire coil.

The pressing parts can be attached to the base element. In particular, they can be formed from a material which is different from the material of the base element. This allows retrofitting existing retainers in the market by providing an assembly comprising the pressing parts and e.g. a set of rivets. The pressing parts are then to be arranged on the base element of the retainer such that they contact the holding fingers and press them downwardly.

As an alternative, the pressing parts are connected to a third retainer element which is placed on top of the upper element. The pressing force here mainly results from the weight of the third retainer element.

According to an embodiment of the invention, the upper element is made from a flexible material, the holding fingers being formed integrally with the upper element. This avoids additional steps for mounting the holding fingers to the upper element.

As an alternative, the upper element is made from a rigid material, the holding fingers being attached to the upper element. This allows to make the upper element from a cheaper, rigid material.

The invention further provides a container for welding wire, having a body, a welding wire coil contained in the body, and a retainer which sits on top of the welding wire coil so as to descend freely when the welding wire is being consumed, the retainer having a base element and at least one upper element which rests on the base element, the base element having a central opening for allowing the welding wire to pass through, and at least two guiding openings through which holding fingers extend, the holding fingers being part of the upper element and being made from a flexible material, the holding fingers interacting with the welding wire coil so as to control pay-out of the welding wire. The elastic holding fingers stay in contact with the upper turns of the welding wire so as to prevent them from falling into the interior of the coil and from entangling.

BRIEF DESCRIPTION OF THE DRAWINGS

Further features and advantages of the invention will be apparent from the following description of the embodiments and the attached drawings to which reference is made and in which:

FIG. 1 shows a schematic, perspective view of a welding wire retainer according to the prior art, FIG. 2 shows a side view of a welding wire container with the retainer of FIG. 1 in an initial condition, FIG. 3 shows a side view of a welding wire container with the retainer of FIG. 1 in a second condition, FIG. 4 shows a perspective view of another retainer according to the prior art, FIG. 5 shows a side view of a welding wire container with the retainer of FIG. 4 in an initial condition, FIG. 6 shows a side view of a welding wire container with the retainer of FIG. 4 in a second condition, FIG. 7 shows a side view of a retainer according to a first embodiment of the invention, FIG. 8 shows the retainer of FIG. 7 in a top view, FIG. 9 shows a cross section along line A-A of FIG. 8 at an enlarged scale, and FIG. 10 shows a cross section along line B-B of FIG. 8 at an enlarged scale.

DETAILED DESCRIPTION

A welding wire container 10 with a welding wire retainer 12 as known from the prior art is shown in FIGS. 1 to 3. The container 10 has a rectangular cross section, side walls 14 (two side walls are shown), a bottom 16 and a lid 18.

In the interior of the container 10, a welding wire coil 20 is accommodated. The welding wire coil 20 consists of a certain amount of welding wire 22 which is coiled so as to form a hollow body with a ring-shaped cross section. The beginning of the welding wire 22 is designated with reference number 24, and the end portion of the welding wire 22 can be fixed to the bottom 16 (not shown).

On the upper side of the welding wire coil 20, the retainer 12 is provided. The retainer 12 has a plate-like body 26 (please see FIG. 1) with a central opening 28 and one recess 30 in each corner to receive reinforcement elements (not shown), which are arranged in the corners of the container 10 to increase the stability of the container 10.

The retainer 12 lies on the upper side of the welding wire coil 20, the retainer 12 being always parallel to the lid 18.

During transportation of the container 10, vibrations might cause the welding wire 22 to settle and sag inwardly. Accordingly, the top surface of the welding wire coil 20 is no longer flat and level but has an upper surface which represents a portion of a cone with the inner portion of the upper coil surface being at a lower level than its outer portion. Then, the retainer 12 can not adapt on the top surface of the welding wire coil 20 and can not contact the entire upper surface of the welding wire coil 20. Therefore, the welding wire 22 is not held in its proper position by the retainer 12 and can entangle.

In FIGS. 4 to 6, a retainer as known from WO 2007/112972 is shown. The retainer 12 has a plate-like base element 32 with a central opening 28 and four recesses 30 for receiving not shown reinforcement elements. The reinforcement elements are arranged in the corners of the container 10 to increase the stability of the container 10. The base element 32 comprises an upper surface 34 and a lower surface 36. The lower surface 36 can engage the top surface of the welding wire coil 20.

The retainer 12 has four holding fingers 38 extending downwardly beyond the lower surface 36 of the retainer 12 to engage the welding wire coil 20 and hold the welding wire 22 in its proper position as to prevent entangling of the welding wire 22. The holding fingers 38 extend in a direction which is oblique with respect to the plane in which the base element 32 lies. In particular, the holding fingers 38 reach to a point in the interior of the welding wire container 10 which is at a lower level than the base element 32. Of course, the number of holding fingers can vary so that more or less than four holding fingers can be arranged.

The retainer 12 has two parts, namely the base element 32 which sits on the upper surface of the welding wire coil 20, and an upper element 40, the upper element 40 being arranged on top of the base element 32.

The base element 32 has four openings 42, the holding fingers 38 being arranged at positions corresponding to the openings 42 of the base element 32 so that each holding finger 28 extends through one of the openings 42. The holding fingers 38 are part of the upper element 40.

Upper element 40 is frame-like and has a polygonal central opening 44 as well as four recesses 46, one recess 46 being positioned in a corner for receiving the reinforcement elements (not shown).

FIG. 5 shows the welding wire coil 20 in its initial condition in which the top surface of the coil 20 is flat and level. Here, there is a surface contact between the flat base element 32 of the retainer 12 and the top surface of the coil 20. The upper element 40 of the retainer 12, in particular its frame-like portion 48, is held spaced apart from the base element 32 as the holding fingers 38, with their inner ends, lie on top of the welding wire coil 20. Especially, the holding fingers 28 lie on the inner portion of the coil 20. The upper element 40 which is arranged on top of the base element 32 rests there due to its own weight. No additional biasing means are provided. The basic retaining effect is provided by the base element 32 of the retainer 12 which contacts the top surface of the welding wire coil 20. Additional retaining effect is provided by the four holding fingers 38 which assist in holding the respective upper welding wire 22 at its correct position.

FIG. 6 shows the welding wire coil 20 in a second condition in which the welding wire 22 has sagged inwardly. The surface of the welding wire coil 20 is no longer flat and level but has an upper surface which represents a portion of a cone with the inner portion of the coil 20 being at a lower level as its outer portion. The upper element 40 has moved downwardly with respect to the base element 32 under its own weight because the holding fingers 38 are still in contact with the top surface of the welding wire coil 20, especially the inner portion of the coil 20, and the inner portion is in this condition at a lower level than in its initial condition and oblique with respect to the plane in which the base element 32 lies.

The base element 32 basically serves for retaining the welding wire 22 in the radially outward portions of the welding wire coil 20 while the holding fingers 38 of the upper element 40 retain the welding wire 22 at the four locations where the holding fingers 38 are provided.

A retainer according to the invention is shown in FIGS. 7 to 10. For the features known from the embodiment of FIGS. 4 to 6, the same reference numerals are used, are reference is made to the above explanations.

The most significant difference between the subject embodiment and the embodiment shown in FIGS. 4 to 6 is that in the subject embodiment, the holding fingers 38 provided on the upper element 32 are flexible and elastic. In other words, they have spring-like properties so that they tend to return into their original position when they are subjected to a load and are deflected. The resiliency of the holding fingers is due to the properties of the material they are made from. Preferably, an elastic plastic material is used. As an alternative, rubber could be used.

The base element can be rigid or flexible but this will have little impact on the actual performance of the retainer. The upper element immediately in contact with the base must be made of flexible material like rubber silicon or cloth. The yieldingness of the upper element together with the flexibility and elasticity of the holding fingers results in a strong interaction between the base element of the retainer and the upper retainer element.

The holding fingers can have various shapes and do not necessarily have to be attached or molded together with the upper element. They could be formed separately and attached to the upper element later.

Another difference between the subject embodiment and the embodiment according to FIGS. 4 to 6 is that in the subject embodiment, base element 32 is provided with pressing parts 50 which engage the holding fingers 38 and maintain the flexible holding fingers of the upper element constantly and dynamically pushed against the wire coil. This effect occurs regardless of the coil varying width, but at the same time release the strand of wire being paid out with little attrition and no deformation.

Pressing parts 50 can be additionally added, inserted, glued, screwed or simply laid on top of the upper plate so as to retrofit existing retainers. They can be made from plastic or aluminum. In the embodiment shown in the drawings, pressing parts 50 are formed integrally with base element 32.

As an alternative, the pressing parts can be part of an additional upper retainer element shown in phantom as element 60 in FIG. 10, having e.g. the shape of a plate 62, and which is placed on top of the upper element 40. The additional upper retainer element can have short projections pressing on the flexible holding fingers of the second plate.

The invention claimed is:

1. A floating retainer for a welding wire container, having a base element, the base element having a central opening for allowing the welding wire to pass through, and at least two guiding openings through which holding fingers extend, the holding fingers being made from a flexible material, wherein pressing parts are provided which are formed integrally with the base element and which act on the holding fingers so as to bend them downwardly, the holding fingers being formed from a flexible and elastic material.

2. The retainer of claim 1, wherein four guiding openings are provided which are evenly spaced in a peripheral direction.

3. A container for welding wire, having a body, a welding wire coil contained in the body, and a floating retainer including holding fingers as claimed in claim 1, which sits on top of the welding wire coil so as to descend freely when the welding wire is being consumed, the holding fingers interacting with the welding wire coil so as to control pay-out of the welding wire.

4. A retainer for a welding wire container, having a base element and at least one upper floating element which rests on the base element, the base element being made from a rigid material and having a central opening for allowing the welding wire to pass through, and at least two guiding openings through which holding fingers extend, the holding fingers being part of the upper element and being made from a flexible material, wherein four guiding openings are provided which are evenly spaced in a peripheral direction; and wherein pressing parts are provided, attached to the base element, and which act on the holding fingers so as to bend them downwardly, said retainer further comprising first and second floating upper elements on top of the base element, wherein the pressing parts are connected to the uppermost floating element.

5. The retainer of claim 4, wherein the upper element is made from a flexible material, the holding fingers being formed integrally with the upper element.

6. The retainer of claim 4, wherein the upper element is made from a rigid material, the holding fingers being attached to the upper element.

7. A container for welding wire, having a body, a welding wire coil contained in the body, and a retainer including holding fingers as claimed in claim 4, which sits on top of the welding wire coil so as to descend freely when the welding wire is being consumed, the holding fingers interacting with the welding wire coil so as to control pay-out of the welding wire.

8. A retainer for a welding wire container, having a base element and at least one floating upper element which rests on the base element, the base element being made from a rigid material having a central opening for allowing the welding wire to pass through, and at least two guiding openings through which holding fingers extend, the holding fingers being part of the upper element and being made from a flexible material, wherein four guiding openings are provided which are evenly spaced in a peripheral direction; and wherein pressing parts are provided, attached to the base element, and connected to a third retainer element which is placed on top of the upper element, which act on the holding fingers so as to bend them downwardly.

9. The retainer of claim 8, wherein the upper element is made from a flexible material, the holding fingers being formed integrally with the upper element.

10. The retainer of claim 8, wherein the upper element is made from a rigid material, the holding fingers being attached to the upper element.

11. A container for welding wire, having a body, a welding wire coil contained in the body, and a retainer including holding fingers as claimed in claim 8, which sits on top of the welding wire coil so as to descend freely when the welding wire is being consumed, the retainer having a base element and at least one upper element which rests on the base element, the base element having a central opening for allowing the welding wire to pass through, and at least two guiding openings through which holding fingers extend, the holding fingers being part of the upper element and being made from a flexible material, the holding fingers interacting with the welding wire coil so as to control pay-out of the welding wire.

* * * * *